(12) United States Patent  (10) Patent No.: US 11,919,226 B2
Biegelsen  (45) Date of Patent: Mar. 5, 2024

(54) METHOD OF JETTING PRINT MATERIAL AND METHOD OF PRINTING

(71) Applicant: XEROX CORPORATION, Norwalk, CT (US)

(72) Inventor: David K. Biegelsen, Portola Valley, CA (US)

(73) Assignee: XEROX CORPORATION, Norwalk, CT (US)

(\*) Notice: Subject to any disclaimer, the term of this patent is extended or adjusted under 35 U.S.C. 154(b) by 61 days.

(21) Appl. No.: 17/448,991

(22) Filed: Sep. 27, 2021

(65) Prior Publication Data

US 2023/0095555 A1    Mar. 30, 2023

(51) Int. Cl.
*B29C 64/112* (2017.01)
*B29C 64/135* (2017.01)
*B29C 64/209* (2017.01)

(52) U.S. Cl.
CPC .......... *B29C 64/112* (2017.08); *B29C 64/135* (2017.08); *B29C 64/209* (2017.08)

(58) Field of Classification Search
CPC ...... B41J 2/14104; B33Y 70/00; B33Y 70/10; B22F 10/34
See application file for complete search history.

(56) References Cited

U.S. PATENT DOCUMENTS

| | | | |
|---|---|---|---|
| 4,925,103 A | 5/1990 | Muench et al. | |
| 5,245,244 A | 9/1993 | Takahashi et al. | |
| 5,261,611 A | 11/1993 | Huxford | |
| 5,276,419 A | 1/1994 | Griffin et al. | |
| 5,377,961 A | 1/1995 | Smith et al. | |
| 5,649,992 A | 7/1997 | Carter, Jr. et al. | |
| 5,779,971 A | 7/1998 | Tsung Pan et al. | |
| 6,202,734 B1 | 3/2001 | Sackinger et al. | |

(Continued)

FOREIGN PATENT DOCUMENTS

| WO | 2007/038987 A1 | 4/2007 |
| WO | 2013/050250 A1 | 4/2013 |
| WO | 2017/089176 A1 | 6/2017 |

OTHER PUBLICATIONS

Biegelsen, D.K., "Printer Jetting Mechanism and Printer Employing the Printer Jetting Mechanism," U.S. Appl. No. 17/448,981, filed Sep. 27, 2021.

(Continued)

*Primary Examiner* — Alex A Rolland
(74) *Attorney, Agent, or Firm* — MH2 Technology Law Group LLP

(57) ABSTRACT

A method of printing a three-dimensional object. The method includes: supplying a print material to a plurality of ejector conduits arranged in an array, the ejector conduits comprising first ends configured to accept the print material and second ends comprising ejector nozzles; advancing the print material in one or more of the ejector conduits of the array until the print material is disposed in the ejector nozzle of the one or more ejector conduits; heating the print material positioned in at least one of the ejector nozzles using radiant energy, the heating causing at least a portion of the print material to be ejected from the at least one of the ejector nozzles and onto a print substrate; and repeating both the advancing the print material and the heating the print material to form a three-dimensional object on the print substrate.

31 Claims, 9 Drawing Sheets

(56) References Cited

U.S. PATENT DOCUMENTS

| | | | |
|---|---|---|---|
| 6,378,743 | B1 | 4/2002 | Kagan |
| 8,444,028 | B2 | 5/2013 | Rasa et al. |
| 8,721,032 | B2 | 5/2014 | Kuznetsov et al. |
| 9,168,549 | B2 | 10/2015 | Slot |
| 9,198,299 | B2 | 11/2015 | Ulmer et al. |
| 9,456,502 | B2 | 9/2016 | Rasa |
| 9,616,494 | B2 | 4/2017 | Vader et al. |
| 10,052,689 | B2 | 8/2018 | Rasa |
| 10,195,665 | B2 | 2/2019 | Sachs et al. |
| 10,543,532 | B2 | 1/2020 | Sachs et al. |
| 10,974,320 | B2 | 4/2021 | Pan et al. |
| 11,241,833 | B2 | 2/2022 | Gandhiraman et al. |
| 11,813,672 | B2 | 11/2023 | Holcomb et al. |
| 2004/0217186 | A1 | 11/2004 | Sachs et al. |
| 2007/0097180 | A1* | 5/2007 | Carlson ............... B41J 2/14104 347/54 |
| 2011/0233239 | A1 | 9/2011 | Rasa et al. |
| 2011/0285792 | A1 | 11/2011 | Byun et al. |
| 2014/0217134 | A1 | 8/2014 | Rasa |
| 2014/0322451 | A1 | 10/2014 | Barton et al. |
| 2015/0273577 | A1 | 10/2015 | Vader et al. |
| 2015/0336170 | A1 | 11/2015 | Wagstaff et al. |
| 2016/0082654 | A1 | 3/2016 | Jakkaku |
| 2016/0107441 | A1 | 4/2016 | Joppen et al. |
| 2016/0236411 | A1 | 8/2016 | Ohnishi |
| 2016/0256888 | A1 | 9/2016 | Rasa et al. |
| 2016/0346998 | A1 | 12/2016 | Mark et al. |
| 2016/0361763 | A1 | 12/2016 | Batchelder et al. |
| 2017/0028467 | A1 | 2/2017 | Rasa |
| 2017/0056966 | A1 | 3/2017 | Myerberg et al. |
| 2017/0087632 | A1 | 3/2017 | Mark |
| 2017/0252829 | A1 | 9/2017 | Sachs |
| 2017/0355138 | A1 | 12/2017 | Mark |
| 2018/0141119 | A1* | 5/2018 | Shu ............... B22F 9/04 |
| 2019/0061349 | A1 | 2/2019 | Kanaris et al. |
| 2019/0143449 | A1* | 5/2019 | Zenou ............... B22F 12/53 219/76.1 |
| 2019/0375003 | A1 | 12/2019 | Mark |
| 2020/0258717 | A1 | 8/2020 | Gandhiraman et al. |
| 2020/0324486 | A1 | 10/2020 | Mantell et al. |
| 2020/0346281 | A1 | 11/2020 | Hosek |
| 2020/0376760 | A1 | 12/2020 | Bruggeman et al. |
| 2021/0070043 | A1 | 3/2021 | Tse et al. |
| 2021/0162493 | A1 | 6/2021 | Herrmann et al. |
| 2021/0178763 | A1 | 6/2021 | Chungbin et al. |
| 2021/0237424 | A1 | 8/2021 | Hara et al. |
| 2021/0245438 | A1 | 8/2021 | Xiao |
| 2021/0323053 | A1 | 10/2021 | Gibson et al. |
| 2022/0062983 | A1 | 3/2022 | Schmitt et al. |
| 2022/0168817 | A1 | 6/2022 | Sambhy et al. |
| 2022/0184948 | A1 | 6/2022 | Wong et al. |
| 2022/0347749 | A1 | 11/2022 | Subramanian |

OTHER PUBLICATIONS

Biegelsen, D.K., et al., "Printer Jetting Mechanism and Printer Employing the Printer Jetting Mechanism," U.S. Appl. No. 17/448,997, filed Sep. 27, 2021.

Biegelsen, D.K., et al., "Method of Jetting Print Material and Method of Printing," U.S. Appl. No. 17/449,006, filed Sep. 27, 2021.

Biegelsen, D.K., "Printer Jetting Mechanism and Printer Employing the Printer Jetting Mechanism," U.S. Appl. No. 17/449,019, filed Sep. 27, 2021.

Biegelsen, D.K., "Method of Jetting Print Material and Method of Printing," U.S. Appl. No. 17/449,021, filed Sep. 27, 2021.

Biegelsen, D.K., et al., "Printer Jetting Mechanism and Printer Employing the Printer Jetting Mechanism," U.S. Appl. No. 17/449,028, filed Sep. 27, 2021.

Biegelsen, D.K., et al., "Ejector Device, 3D Printer Employing the Ejector Device and Method of 3D Printing," U.S. Appl. No. 17/449,043, filed Sep. 27, 2021.

Biegelsen, D.K., et al., "Method of Jetting Print Material Using Ejector Devices and Methods of Making the Ejector Devices," U.S. Appl. No. 17/449,046, filed Sep. 27, 2021.

Author Unknown, "Chapter 12—Magnetism and Magnetic Circuits," date unknown, 14 pages.

Author Unknown, "Macor—Machinable Glass Ceramic for Industrial Applications," date unknown, 6 pages.

Prime Faraday Partnership, "An Introduction to MEMS," published in 2002, Wolfson School of Mechanical and Manufacturing Engineering Loughborough University, 56 pages.

Ansell, T.Y, "Current Status of Liquid Metal Printing," Journal of Manufacturing and Materials Processing, Apr. 6, 2021, vol. 5, No. 2, 36 pages, https://doi.org/10.3390/jmmp5020031.

* cited by examiner

METHOD OF JETTING PRINT MATERIAL AND METHOD OF PRINTING

DETAILED DESCRIPTION

Field of the Disclosure

The present disclosure is directed to a printer jetting mechanism that can be employed in printers used for additive manufacturing (referred to herein as three-dimensional ("3D") printers). The present disclosure is also directed to methods of jetting print material, including methods of 3D printing.

Background

Melting of solid materials, including materials in the form of solid filaments, is commonly used in 3D printing techniques. It is well understood that when phase change or heating of a material occurs, the material generally expands and, in the case of phase change from solid to liquid, becomes flowable. Print materials are often melted to allow flow of the material and deposition onto a substrate in order to form a 3D object therefrom. As a specific example, liquid three-dimensional printers for building 3D objects from molten aluminum are known in the art. One such 3D printer is disclosed in U.S. Pat. No. 9,616,494. The 3D printer works by using DC pulses applied by an electromagnetic coil to expel molten aluminum drops in response. A platen to which the drops are targeted translates to allow for the drops to be connected and built up to produce a three-dimensional object. However, drops of molten aluminum ejected from this 3D printer have diameters of ~0.5 mm or larger. This enables high volume throughput metal part fabrication. However, the relatively large drop size can result in an undesirable degree of porosity of 3D objects printed thereby, as well as uneven build surfaces during fabrication, unwelded drops, and shape inconsistencies. All of these potentially lead to degraded physical properties such as poor tensile strength, as well as poor appearance issues with the final object and/or the inability to print objects with very fine details.

Therefore, methods and systems for improving the quality of three-dimensional objects made from three-dimensional printers, such as, for example, liquid metal printers, would be a step forward in the art.

SUMMARY

An embodiment of the present disclosure is directed to a method of printing a three-dimensional object. The method comprises: supplying a print material to a plurality of ejector conduits arranged in an array, the ejector conduits comprising first ends configured to accept the print material and second ends comprising ejector nozzles; advancing the print material in one or more of the ejector conduits of the array until the print material is disposed in the ejector nozzle of the one or more ejector conduits; heating the print material positioned in at least one of the ejector nozzles using radiant energy, the heating causing at least a portion of the print material to be ejected from the at least one of the ejector nozzles and onto a print substrate; and repeating both the advancing the print material and the heating the print material to form a three-dimensional object on the print substrate.

Another embodiment of the present disclosure is directed to a method for jetting print material from a printer jetting mechanism. The method comprises: supplying a print material to a plurality of ejector conduits arranged in an array, the ejector conduits comprising first ends configured to accept the print material and second ends comprising ejector nozzles; advancing the print material in one or more of the ejector conduits of the array until the print material is disposed in the ejector nozzles of the one or more ejector conduits; and heating the print material positioned in at least one of the ejector nozzles using radiant energy, the heating causing at least a portion of the print material to be ejected from the at least one of the ejector nozzles.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
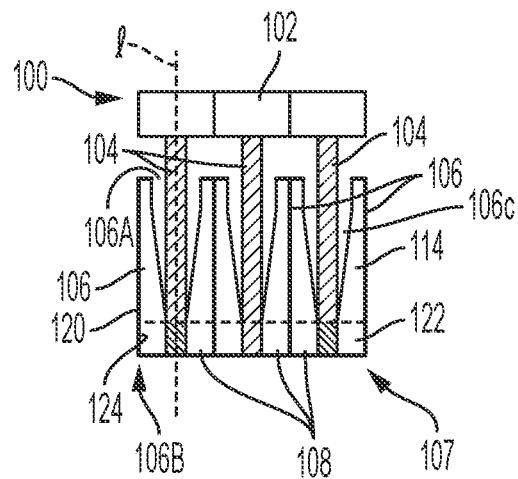
FIG. 1 illustrates an example of a printer jetting mechanism, according to an embodiment of the present disclosure.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which show by way of illustration specific exemplary embodiments in which the present teachings may be practiced. The following description is, therefore, merely exemplary.

The present disclosure is directed to a printer jetting mechanism comprising a plurality of ejector conduits arranged in a jet array, as well as a 3D printer employing the printer jetting mechanism. Methods of employing such a jetting mechanism for jetting print material are also disclosed. The printer jetting mechanism is designed to employ a radiant energy induced expansion of the print material as the force for jetting, as will be described in greater detail herein. The jetting mechanism, 3D printer and methods of printing disclosed herein can provide one or more of the following advantages: the ability to selectively jet print material comprising a wide range of metals and other materials; the ability to jet selectable droplet volumes; the ability to jet small droplet sizes that enable printing of fine and/or selectable feature sizes; and the ability to print at relatively high throughputs.

Printer Jetting Mechanism

Figure 2:
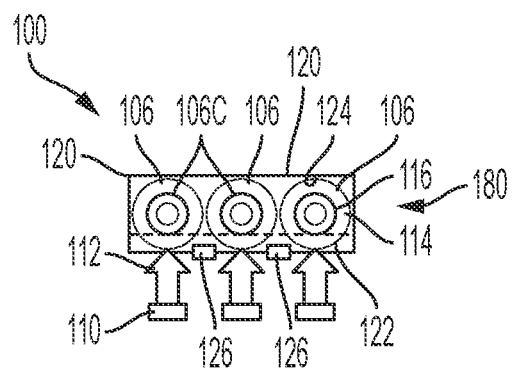
FIG. 2 illustrates a top view of a printer jetting mechanism, according to an example of the present disclosure.

FIG. 1 illustrates an example of a printer jetting mechanism 100, according to an embodiment of the present disclosure. The printer jetting mechanism 100 optionally comprises a feeder mechanism 102 for advancing a print material 104 to be printed. Exemplary printing materials 104 are pre-formed wires of selected alloys, or other materials as will be discussed in greater detail below. A plurality of ejector conduits 106 are arranged in an array 107. Each ejector conduit 106 comprises a first end 106A positioned to accept the print material 104 from the feeder mechanism 102. A second end 106B comprises an ejector nozzle 108. FIG. 2 illustrates a top view of the printer jetting mechanism 100. A passageway 106C defined by an inner surface of each of the ejector conduits 106 allows the print material 104 to pass through the ejector conduits 106 from the first end 106A to the second end 106B. As also illustrated in FIG. 2, the printer jetting mechanism further comprises a plurality of radiant energy sources 110 for emitting radiant energy 112. The plurality of radiant energy sources 110 are positionable so that a path of radiant energy 112 emitted from one or more of the plurality of radiant energy sources 110 is capable of striking the ejector nozzle 108 of each of the plurality of ejector conduits 106 during operation of the printer jetting mechanism 100. Referring to FIG. 2, the plurality of radiant energy sources 110, which can be lasers (e.g., laser pixels in a laser array) or any other source of radiant energy suitable for providing thermal energy to the ejector nozzle, are switched on or off as desired to heat the print material 104 in the ejector nozzle 108 to achieve a rapid expansion of the print material. The rapid expansion of print material can include a phase change (e.g., melting) of the print material or can be accomplished by expansion of the material in a single phase. Examples of lasers that can be employed as radiant energy sources 110 include fiber laser arrays or scanned and modulated lasers, which can provide suitable pulses of radiation for the desired expansion of the print material and which are well known in the art.

The radiant energy sources 110 can be chosen to emit radiation at any wavelength that is suitable for providing the desired thermal energy to achieve expansion of the print material. The particular wavelengths employed will depend on the type of print materials used, among other things. Examples of suitable wavelengths range from ultraviolet ("UV") wavelengths to near infrared ("NIR") wavelengths, such as about 300 nm to about 1500 nm. As another example, the wavelengths range from about 600 nm to about 1100 nm.

Figure 3:
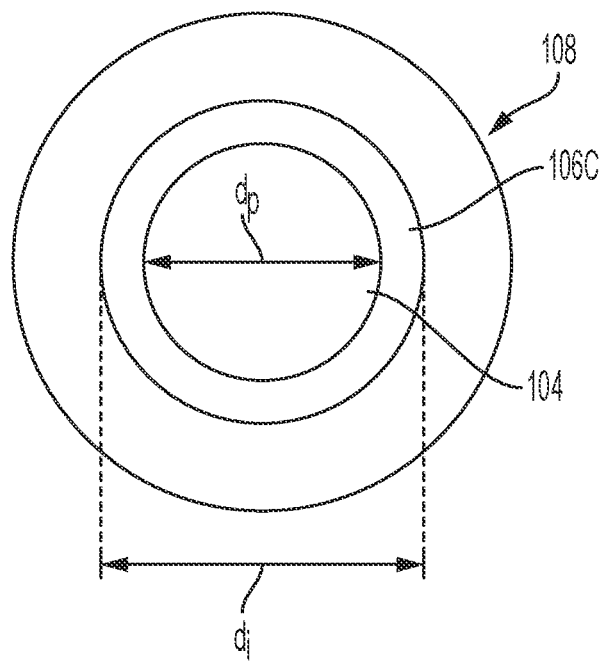
FIG. 3 illustrates a bottom view of an ejector nozzle having an inner width (e.g., diameter), $d_i$, according to an embodiment of the present disclosure.

Referring to FIG. 3, the ejector nozzle 108 has an inner width (e.g., inner diameter), $d_i$, which ranges in size, for example, from about 10 microns to about 1000 microns, from about 20 microns to about 500 microns, from about 50 microns to about 200 microns, or about 100 microns. In an embodiment, $d_i$ ranges in size from about 10 microns to about 100 microns, such as about 10 microns to about 50 microns, or about 10 microns to about 25 microns. While the cross-sectional shape of the ejector passageway is illustrated as being a circle having a diameter, $d_i$, it is noted that any other cross-sectional shape can be employed, such as, for example, a rectangle or other polygon, oval or other shape. The inner width for cross-sectional shapes other than a circle is the widest cross-sectional dimension (e.g. the diagonal between two opposite vertices of a square cross-section), where the cross-section lies in a plane that is perpendicular in all directions to the longitudinal axis, "/", (FIG. 1) of the passageway 106C at the point where the cross-section intersects the passageway 106C. If there is more than one possible value for $d_i$ (e.g., such as if the value for $d_i$ varies along the length of the ejector nozzle 108), then the $d_i$ is the smallest of the possible $d_i$ values for the ejector nozzle 108. Although "inner width" is often referred to as "inner diameter" herein, the term "diameter" or "inner diameter" can be replaced by "inner width" when discussing the ejector nozzle's inner diameter throughout this disclosure.

The ejector nozzles 108 can be an end portion of the ejector conduits 106 that is positioned to be exposed to the radiant energy 112 from radiant energy sources 110 during operation of the printer jetting mechanism 100. A length of the ejector nozzle 108 can range, for example, from about 1 to about 10 times the inner width (e.g., inner diameter). The design and materials of the ejector nozzles 108 can be the same as or different than the remaining portion of the ejector conduits 106.

In an embodiment, passageway 106C of the ejector conduits 106 has a second inner width at the first end 106A, the second inner width being wider than the inner width, $d_i$, of the ejector nozzle 108 in order to allow the print material to be easily threaded into the first end 106A, while allowing passageway 106C to closely fit around print material within the ejector nozzle 108. In an embodiment, the passageway 106C can gradually taper from the second inner width to the inner width of the ejector nozzle 108 to avoid print material 104 in the form of a solid filament from being caught in and/or undesirably blocking the passageway 106C.

The feeder mechanism 102 can by any suitable mechanical system, pressure driven system or other system capable of feeding print material 104 to the ejector conduits 106. The feeder mechanisms can comprise one or more pumps, actuators or combination thereof that can function as a mover 102a (FIG. 11) for moving the print material 104. Examples of suitable actuators include electric motors, piezo electric motors, inchworm actuators, hydraulic actuators, and pneumatic actuators. The type of feeder mechanism 102 that is used will depend on the type of print material 104 being employed. In an example, print material 104 comprises a plurality of filaments and the feeder mechanism 102 is a mechanism for advancing the plurality of filaments. The term "filament" or "filaments" for purposes of the present disclosure is defined to include both solid wire-like filaments or liquid filaments, such as liquid filled capillaries or other liquid filled conduits. Examples of feeder mechanisms for solid filaments include spool feeders and inch worm actuators, which are well known in the art. Other feeder devices for ratcheting or otherwise advancing solid print material 104 to the ejector conduits 106 in the form of solid filaments, dry powders or other solid forms can also be employed as the feeder mechanism 102, as would be understood by one of ordinary skill in the art.

In embodiments, the feeder mechanism 102 can be any suitable mechanism for supplying a liquid print material, such as a liquid filament, into the ejector conduits 106 and advancing the liquid print material to the ejector nozzles 108. Examples of suitable feeder mechanisms for liquid print materials include mechanisms employing capillary forces and/or overpressures sufficient to advance the liquid from a reservoir or other source of print material (e.g., molten metal) and thereby stably refill the ejector nozzles 108 after ejection occurs (e.g., the feeder mechanism can be designed to automatically refill the ejector nozzles after an ejection occurs). The feeder mechanisms 102 can comprise, for example, a pump, a feeder conduit and/or print material reservoir configuration that can be filled with print material to provide a hydrostatic pressure head (e.g., by maintaining a certain fill level of print material in the reservoir), or any other device for applying overpressure. Such feeder mechanisms are well known in the art. One of ordinary skill in the art would be able to readily determine an appropriate feeder mechanism.

In an embodiment, the feeder mechanism 102 can supply the print material to each ejector conduit 106 at a different feed rate. As an example, a feeder mechanism 102 for advancing the plurality of filaments comprises a separate mechanism for incrementally advancing each of the plurality of filaments at a separately controllable feed rate. Thus, in an embodiment, as the ejection rate at each ejector is increased or decreased as desired for printing, the feed rate is able to satisfy replenishment of print material 104 to the ejector nozzles before the next ejection.

The plurality of ejector conduits 106, including the ejector nozzles 108, can comprise any material that can withstand jetting process temperatures, which will vary widely depending on the print material 104 to be printed, while maintaining desired structural integrity and energy transfer properties, such as light absorbing and/or light transmitting properties. In an embodiment, the material is a refractory material. For purposes of the present disclosure, the terms "refractory material" and "refractory materials" are broadly defined as any materials that have a melting point of 1000° C. or more at 1 atmosphere pressure. For example, the refractory material can have a melting point ranging from 1000° C. to about 4000° C., such as about 1200° C. to about 4000° C., or about 1400° C. to about 3500° C., or about 1700° C. to about 3500° C., or about 2000° C. to about 3500° C. Ejector conduit materials can have melting points outside of these ranges. For example, where the print material 104 is a polymer, ejector conduits can potentially be made of materials with melting points lower than 1000° C., such as 800° C., 700° C., 500° C. or lower. The material employed for the ejector conduits 106 can be chosen from materials, such as refractory materials, that are transparent to the radiation 112, materials, such as refractory materials, that absorb the radiant energy 112, or a combination thereof.

Referring to FIG. 1, the ejector conduits 106, including the ejector nozzles 108, can comprise a transparent material 114 that allows the radiation 112 to be transmitted through the sidewall of the ejector conduit to directly strike the print material 104, according to an embodiment of the present disclosure. The transparent material 114 can comprise any material that has both the desired transparency and refractory properties, which may depend on the wavelength of the radiation 112 and the print material expansion temperatures, among other things. Examples include materials chosen from doped or undoped amorphous silica (e.g., fused silica) and sapphire. In an embodiment, the sidewalls of the ejector conduits 106 can be designed so that the transparent material 114 will refract excess portions of the radiant energy 112 that strike the sides of the ejector conduit 106 but that would otherwise miss the print material 104, so that the excess portions are redirected toward a portion of the passageway 106C within the ejector nozzle 108 so as to strike the print material 104 during operation of the printer jetting mechanism 100. For example, cylindrically shaped glass ejector conduits 106 can act as a lens to refract light inward so that the light strikes a reflective surface (e.g., ejector housing 120) at the back side of the ejector conduit 106. The reflective surface can then focus the light into the inner diameter of the ejector conduits 106 so that the light can strike the print material 104.

In another embodiment, the ejector conduits 106, including the ejector nozzles 108, comprise a combination of transparent and absorbing materials, such as where at least a portion of each of the plurality of ejector conduits 106 comprises a material, such as a refractory material, suitable for absorbing the radiant energy and converting it to thermal energy in an amount sufficient to cause an expansion of the print material in the ejector nozzle 108. An example of such an embodiment is illustrated in FIG. 2, which shows the plurality of ejector conduits 106 comprising a layer of transparent material 114, which can be any of the transparent materials as described above, and a layer of optical absorption material 116 that is suitable for absorbing the radiant energy 112. The layer of optical absorption material 116 is disposed, for example, so as to form the inner surface of the plurality of ejector conduits 106. Any material that has the desired radiation absorption properties and refractory properties can be employed. For example, the layer of optical absorption material 116 can comprise at least one material chosen from diamond-like carbon, graphite, black chrome and black alumina. The layer of optical absorption material 116 can have any suitable thickness that provides the desired thermal energy to the print material 104. As an example, the thickness can be approximately equal to the optical absorption length of the material at the wavelength of radiant energy 112. Thicker layers can also be employed, although thickening may reduce the amount of heat energy transferred to the filament material. Examples of thicknesses range from about 10 nm to about 10000 nm, such as about 25 nm to about 1000 nm, or about 50 nm to about 500 nm, or about 100 nm.

Other configurations can also be employed for the ejector conduits 106. In an embodiment, the ejector conduits 106, including the ejector nozzles 108, can comprise an absorbing material 116 alone, without the transparent material 114. For example, the entire ejector conduit 106 can potentially comprise a thin-walled metal conduit with high thermal conductance, such as copper, copper alloys, refractory metals or other metals with a suitably high thermal conductance and melting point for the printing application.

While the entire ejector conduit, including the ejector nozzles 108, can comprise the same materials, in an alternative embodiment the ejector nozzle 108 can comprise different materials than other portions of the ejector conduit 106. For example, the ejector nozzle can comprise a transparent material 114 that allows the radiation 112 to strike the print material 104, while the remaining portion of the ejector conduit 106 can comprise a material, such as a refractory material, that is not transparent, such as graphite, platinum, platinum alloys, tungsten, tungsten alloys, other metals with a suitably high melting point, such as refractory metals, or ceramic materials. In yet another example, the ejector nozzle 108 can comprise a transparent material 114 and a layer of optical absorption material 116, similarly as described above for the ejector conduits 106 of FIG. 2, while the remaining portion of the ejector conduit 106 can comprise a single material or different combination of materials than is employed in the ejector nozzle 108. The term "refractory metal" as used herein is defined to include the elemental refractory metals and alloys thereof, including, for example, niobium, molybdenum, tantalum, tungsten, rhenium, titanium, vanadium, chromium, zirconium, hafnium, ruthenium, rhodium, osmium, iridium and alloys of any of these metals, such as alloys of two or more of any of the refractory metals listed herein or alloys of one or more of the refractory metals with other metals, such as iron, nickel, copper, silver or others. Suitable refractory metal alloys are known in the art.

Figure 5A:
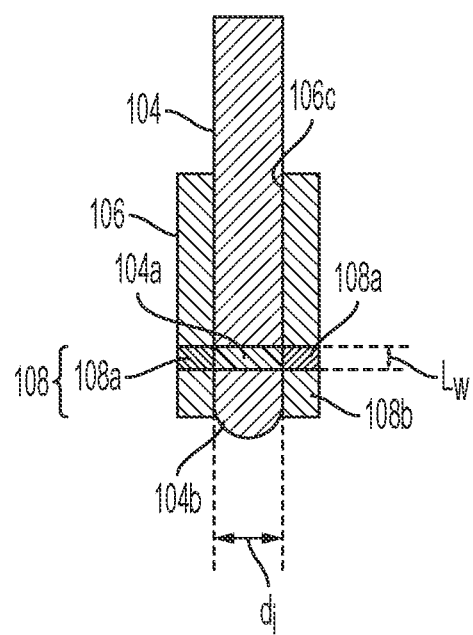
FIG. 5A illustrates a schematic, cross-sectional view of an ejector conduit with a print material therein that can be employed in the printer jetting mechanisms described herein, according to an embodiment of the present disclosure.

FIG. 5A illustrates a configuration of an ejector conduit 106 that can be employed in any of the printer jetting mechanisms 100 described herein, according to an embodiment of the present disclosure. The ejector conduit 106 of FIG. 5A comprises at least one window 108a positioned proximate a top portion of the ejector nozzle 108. The at least one window 108a allows radiant energy 112 from radiant energy sources 110 to be transmitted therethrough to be absorbed by a portion of print material 104 positioned proximate to the at least one window 108a. FIG. 5A shows a cross section of the conduit 106 with a window 108a on two opposing sides of the ejector nozzle 108. In an embodiment, the windows 108a can be two separate windows positioned on opposing sides of ejector nozzle 108 that are of sufficient size to allow in a desired amount of radiant energy 112. In another embodiment, the ejector nozzle 108 of FIG. 5A can include a single window 108a that extends around the entire circumference of the ejector nozzle 108. In another embodiment (not shown) a single window 108a can be positioned on one side of the ejector nozzle 108 with no window positioned on the opposing side of the ejector nozzle 108. Other configurations of windows 108a are possible so long as they allow sufficient transmission of radiant energy 112 at the desired position of nozzle 108 so as to provide a motive force for ejecting print material 104b from the ejector nozzle, as will be described in more detail below. The at least one windows 108a comprises a material that is transparent to the radiant energy 112, such as fused silica or sapphire, or any of the transparent materials 114 described herein. A lower portion 108b of the ejector nozzle 108 can comprises an opaque material. Examples of such opaque materials include any of the refractory materials listed herein that are opaque, such as graphite, platinum, platinum alloys, tungsten, tungsten alloys, other suitable metals, such as refractory metals, or ceramic materials. In an alternative embodiment, where it is desired that print material in the entire nozzle be heated, the at least one window 108a can extend the entire length of the nozzle 108. In yet another embodiment, where it is desired that print material in only a lower portion of the nozzle be heated, the at least one window can be positioned lower in the nozzle, such as at or near the tip of the nozzle 108, rather than proximate a top portion of the ejector nozzle 108 as is shown in FIG. 5A. In such an embodiment, the nozzle 108 can comprise opaque material above and/or below the window, such as any of the opaque materials described herein.

In an embodiment, as will be described in greater detail below, the print material 104 that is proximate the at least one window 108a is heated (e.g., from a liquid to a gas) by absorption of radiant energy 112 to provide the desired expansion and jetting of the print material 104 from the ejector nozzle 108. The length, Lw, of window 108 can be any desired length that will allow sufficient transmission of radiant energy 112 to heat and vaporize a desired amount of the print material 104 so as to drive ejection of the print material from the ejector nozzle 108. Examples of suitable values for $L_w$ are about 5 microns to about 1000 microns, such as about 5 microns to about 500 microns, such as about 10 microns to about 100 microns, or about 15 microns to about 50 microns.

In an embodiment, the outside surface of any of the ejector nozzles 108 described herein can be coated with an anti-reflective coating to reduce reflection of the radiant energy 112 and thereby increase absorption of energy, either directly or indirectly, into the print material 104. Examples of suitable antireflection coatings, such as dielectrics, including stacks of dielectrics, or other materials, are well known in the art.

Referring to FIG. 2, the plurality of ejector conduits 106 are supported within an ejector housing 120. The ejector conduits 106 can be separate structures from the housing material and can be mounted in any suitable fashion to the ejector housing 120. In an alternative embodiment, the plurality of ejector conduits can be integral with the ejector housing 120. For example, the conduits can be formed as capillaries or larger conduits bored or otherwise formed directly in the housing material. The conduits can optionally be coated to provide an inner surface of the ejector conduits 106 comprising a material that is different from, but integral with, the ejector housing 120. Techniques for forming such conduits directly in the housing material, as well as techniques for coating the conduits, are generally well known. In embodiments, the ejector conduits 106 can comprise a different material or the same material as the ejector housing 120.

The ejector housing 120 comprises any suitable materials that can withstand jetting process temperatures and that can provide the desired support for the ejector conduits 106. Examples of suitable housing materials include materials chosen from metals, such as aluminum, copper, brass and steel, refractory metals, ceramics, other refractory materials, polymers that are capable of withstanding process temperatures (e.g., polymers with melting points of 150° C. to 650° C. or higher, such as 200° C. to 300° C.) and combinations thereof, such as metal coated ceramics and ceramic coated metals. An example of a composite housing material is copper clad with a ceramic, such as mullite, where the copper and mullite have similar thermal expansion coefficients. The specific material employed will depend on the print material to be jetted.

The ejector housing 120 comprises an inlet 122 where a portion of the housing wall is removed to allow the radiant energy 112 from radiant energy sources 110 to strike the ejector nozzle 108 of each of the plurality of ejector conduits 106. As an example, such an inlet 122 is indicated by the dotted lines in FIGS. 1, 2 and 4. For instance, in FIG. 1, the region below the dotted line is an opening in the ejector housing that is the inlet 122.

Figure 4:
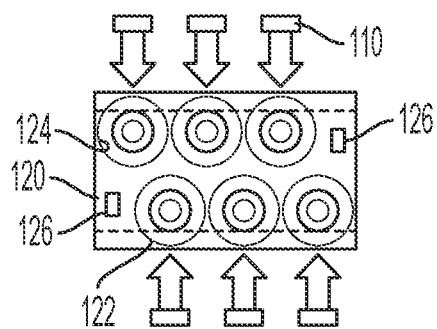
FIG. 4 illustrates a top view of a printer jetting mechanism comprising columns of ejector conduits that are staggered, according to an embodiment of the present disclosure.

The radiant energy sources 110 can be any suitable radiant energy sources that provide the desired thermal energy for the expansion of the print material 104 in a relatively short amount of time. In an example, the radiant energy sources 110 are lasers. Examples of suitable types of lasers include fiber lasers; modulated lasers; scanning lasers and scanning, modulated lasers, as well as others. As illustrated in FIGS. 2 and 4, the radiant energy sources 110 can be positioned on one, two or more sides of the array and are positionable so as to be capable of striking the ejector nozzles 108 of each of the plurality of ejector conduits during operation of the printer jetting mechanism 100. While radiant energy sources 110 are shown positioned so that radiant energy 112 from one radiant energy source strikes each ejector nozzle, multiple radiant energy sources can be positioned to strike each ejector nozzle 108 through one or more inlets 122 if it is desirable to provide increased thermal flux to the print material 104. The radiant energy sources 110 have sufficient power to heat print material 104 in the ejector nozzles 108 and cause the print material 104 to expand sufficiently rapidly so as to provide sufficient momentum to eject, or jet, at least a portion of the print material from the ejector nozzles 108. The rapid expansion of the print material that results in the desired ejection of the print material, also referred to herein as jetting, may or may not include heating to cause a phase change of the print material, as will be described in greater detail below.

In an embodiment, at least a portion of the ejector housing 120 comprises a reflective surface 124. The reflective surface can surround the inlet 122 so as to reflect radiant energy 112 toward the ejector nozzle 108 during printing. This can allow for more efficient and/or more uniform heating and/or expansion of the print material 104.

In an embodiment, the ejector housing 120 comprises a heater mechanism 126 for heating at least a portion of the ejector housing 120 surrounding the ejector conduits 106 during operation of the three-dimensional printer. The heater mechanism 126 is separate from the plurality of radiant energy sources 110. The heater mechanism 126 can provide sufficient thermal energy so as to bring the print material 104 to at or just below a desired print material expansion temperature. For example, in cases where expansion to provide ejection momentum of the print material does not involve a phase change, then heater mechanism 126 can provide sufficient thermal energy so as to bring the print material 104 to at or just above the melting temperature. Alternatively, in the case of a phase change expansion to provide momentum of the print material for ejection, heater mechanism 126 can provide sufficient thermal energy so as to bring the print material 104 to a temperature that is at or just below the melting temperature or vaporization temperature of print material 104, as desired. In an embodiment where phase change of the print material occurs, by controlling the print material temperature near the ejection site, heat loss away from the ejector nozzle 108 (e.g., the melt zone or vaporization zone) can be reduced because the phase change is an isothermal process. In embodiments where the print material 104 is a solid prior to phase change, temperatures lower than the melting temperature can be desirable to ensure resolidification of non-ejected material before the next ejection event.

Heater mechanism 126 can comprise, for example, any suitable type of resistive heater, inductive heater, radiant heater or combination of any of these. For instance, heater mechanism 126 comprises heating elements that are embedded in or positioned proximate to the conduits 106 and/or the ejector housing 120, such as illustrated in FIGS. 2 and 4. The heating elements can be in the form of resistive heating coils or induction coils, as examples. As an example, a suitable resistive heater mechanism comprises an ohmic meander trace embedded in the ejector housing 120 or ejector conduits 106 surrounding the passageway 106C. The term "ohmic meander trace," as used herein, refers to a conductive heating element that has a non-linear path along a longitudinal axis (e.g., a wire suitable for resistive heating having a zig-zagging, winding or otherwise curved path). The heater mechanism 126 is separate from the plurality of radiant energy sources 110.

In an embodiment, the array of ejector conduits 106 includes M columns of ejector conduits arranged on an X axis and N rows of ejector conduits arranged on a Y axis, where M is an integer ranging from 2 to 1000 and N is an integer ranging from 1 to 2. For example, M is 3 and N is 1 for the array of FIG. 2, while M is 3 and N is 2 for the array of FIG. 9. In other examples, M is an integer ranging from 5 to 1000, 50 to 1000, or 100 to 500.

In an embodiment, the rows of the ejector conduits 106 are arranged linearly and the ejector conduits 106 in each row are staggered with respect to the ejector conduits of adjacent rows, to facilitate closer packing, as shown, for example, in FIG. 4. In an alternative embodiment (not shown), the columns of the ejector conduits 106 are arranged linearly and the ejector conduits 106 in each column are staggered with respect to the ejector conduits of adjacent columns.

Figure 6:
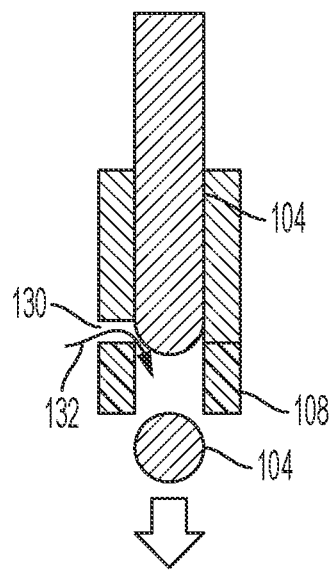
FIG. 6 illustrates a schematic, cross-sectional view of an ejector conduit comprising a vent, according to an embodiment of the present disclosure.
Figure 7A:
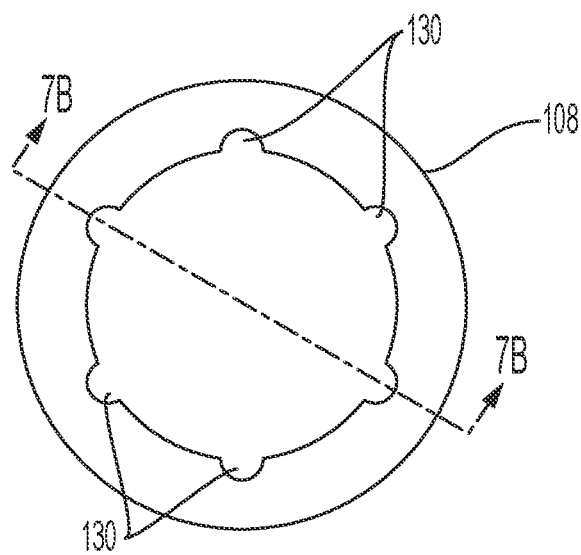
FIG. 7A illustrates a schematic, bottom view of an ejector nozzle comprising a plurality of vents, according to an embodiment of the present disclosure.
Figure 7B:
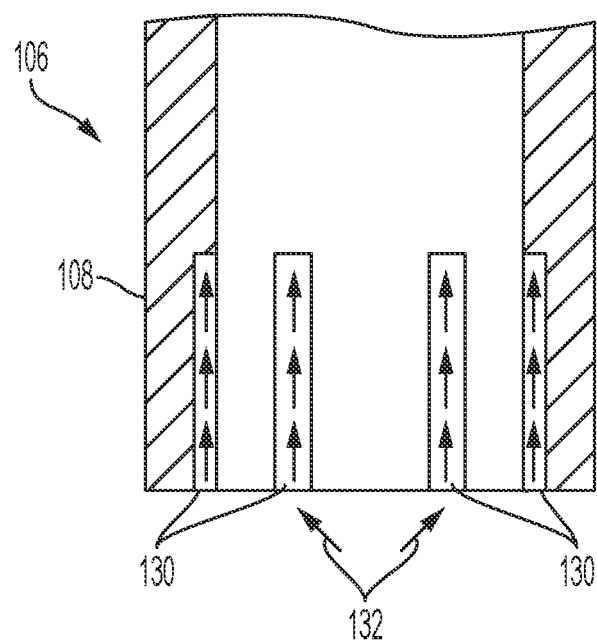
FIG. 7B illustrates a schematic, cross-sectional view along line A-A of a portion of an ejector conduit 106 that includes the ejector nozzle of FIG. 7A, according to an embodiment of the present disclosure.

In an embodiment, the ejector conduits 106 include one or more vents 130, such as illustrated in FIG. 6. Vents 130 can be positioned in or just above ejector nozzles 108. The vents allow air or other ambient gas (as illustrated by arrow 132) to flow from outside the ejector conduits 106 into the ejector conduits 106 and/or into the ejector nozzles 108 as the print material 104 is ejected therefrom. This can allow the print material being ejected from ejector nozzles 108 to more easily be separated from the remaining print material 104 in ejector conduit 106 and/or more easily be ejected from the ejector nozzles 108. The one or more vents 130 can be in any form that will allow ambient gas to flow into the nozzle as the print material 104 is ejected. FIGS. 7A and 7B illustrate another example in which the vents 130 take the form of grooves on the inner surface of the ejector nozzles 108. Any other suitable vent configurations could be employed. In an embodiment, the vents 130, such as in FIGS. 6, 7A and 7B have dimensions that are sufficiently small so that the surface tension of liquid print material 104 would not allow substantial amounts of the print material to flow out of the ejector conduits through the vents 130, while being sufficiently large to allow ambient gas to flow through the grooves and into the ejector nozzle 108. For example, the width and/or length of the vent 130 of FIG. 6 or diameters, in the case of circular shaped vents (not shown), or groove widths of FIG. 7 can be ten or more times smaller than the inner width (e.g., diameter) of the ejector nozzle so that penetration of the liquid print material is reduced or eliminated. The vents can be formed by any suitable means, such as by etching techniques or laser ablation that are well known in the art.

The present disclosure is not intended to be limited to any specific droplet jetting and/or detaching modes. For example, while the droplets can neck off and detach at a detachment zone inside the ejector conduits 106, it is also possible that the droplets can neck off and detach outside the ejector conduits 106, followed by retraction of undetached print material 104 back into the ejector conduit 106. Thus, a mode of jetting of droplets can include expansion "extrusion" of the molten print material 104 out from the ejector nozzle 108 into free space followed by a deacceleration/retraction of the extruded print material 104 as the heating pulse is terminated and the print material 104 cools/contracts. Other modes of jetting and/or detaching droplets can also be realized.

In an embodiment, ejecting at least a portion of the print material comprises flowing a sheath gas proximate the ejector nozzles, the sheath gas comprising one or both of an inert gas and a reducing gas. An example of employing a sheath gas is illustrated by the arrows 210 in FIG. 10. The sheath gas flow can be accomplished in any suitable manner, such as, for example, by flowing the sheath gas through sheath gas vents 212 positioned in the ejector housing 120. In an embodiment, the sheath gas is maintained at a desired temperature so as to avoid cooling the print material prior to deposition. For example, the sheath gas temperature can be at or above the melting point of the print material. In this manner, the print material can be maintained in a molten state until deposition on the substrate occurs, if desired. In an embodiment, the sheath gas can be moving at approximately the same velocity, and in approximately the same direction, as the droplets when they are ejected.

Figure 8:
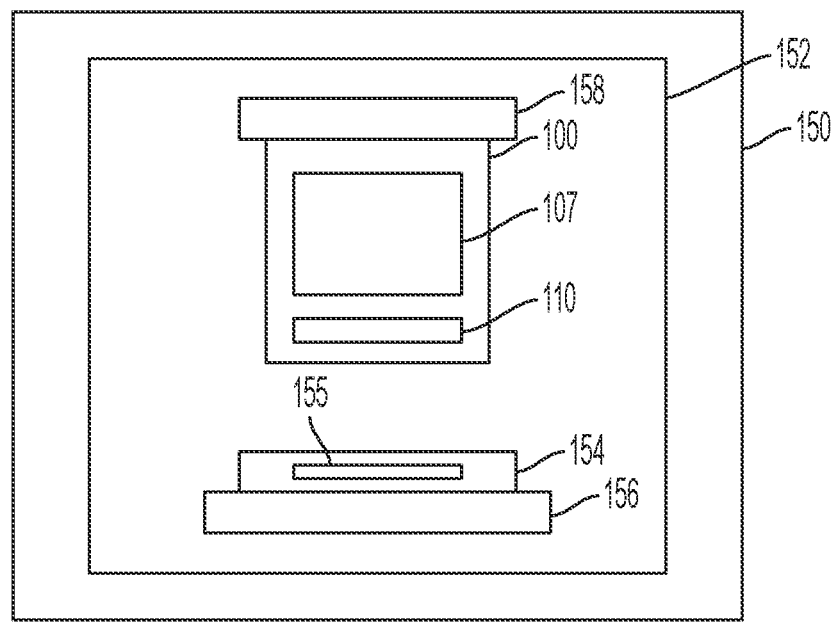
FIG. 8 is a block diagram of a 3D printer, according to an embodiment of the present disclosure.

The printer jetting mechanisms 100 described herein can be employed in any type of printer that is suitable for jetting of a print material. In an embodiment, the printer is a three-dimensional ("3D") printer usable for printing 3D objects. A block diagram of an example 3D printer 150 is shown in FIG. 8. The 3D printer 150 can comprises any of the printer jetting mechanisms 100 comprising an array 107 of ejector conduits 106, as described herein. Additionally, the 3D printer can comprise a positioning system 152 for controlling the relative position of the array 107 with respect to a print substrate 154. The phrase "controlling the relative position of the array 107 with respect to the print substrate 154" means that either one or both of the array 107 and the print substrate 154 can be moved in order to alter the relative position of the array with the print substrate. The relative position of the array 107 with the print substrate 154 is modified during printing so that the print substrate 154 is positioned to receive print material 104 jettable from the plurality of ejector conduits and thereby form a 3D object. The positioning system 152 can comprise one or both of a print substrate handling mechanism 156 for positioning the print substrate 154 and an array positioning mechanism 158 for positioning the array 107 and optionally other parts of the printer jetting mechanism 100, such as the plurality of radiant energy sources 110. The print substrate 154 can comprise any substrate on which it is desirable to print a three-dimensional object. An example of a print substrate 154 is a build plate that is part of the 3D printer 150, or other temporary substrate from which the 3D object may be removed after printing. In another example, the print substrate 154 may be intended to be permanently attached to the three-dimensional object after printing, such as, for example, if the print substrate 154 is a printed circuit board on which a portion of a circuit is being printed.

Figure 11:
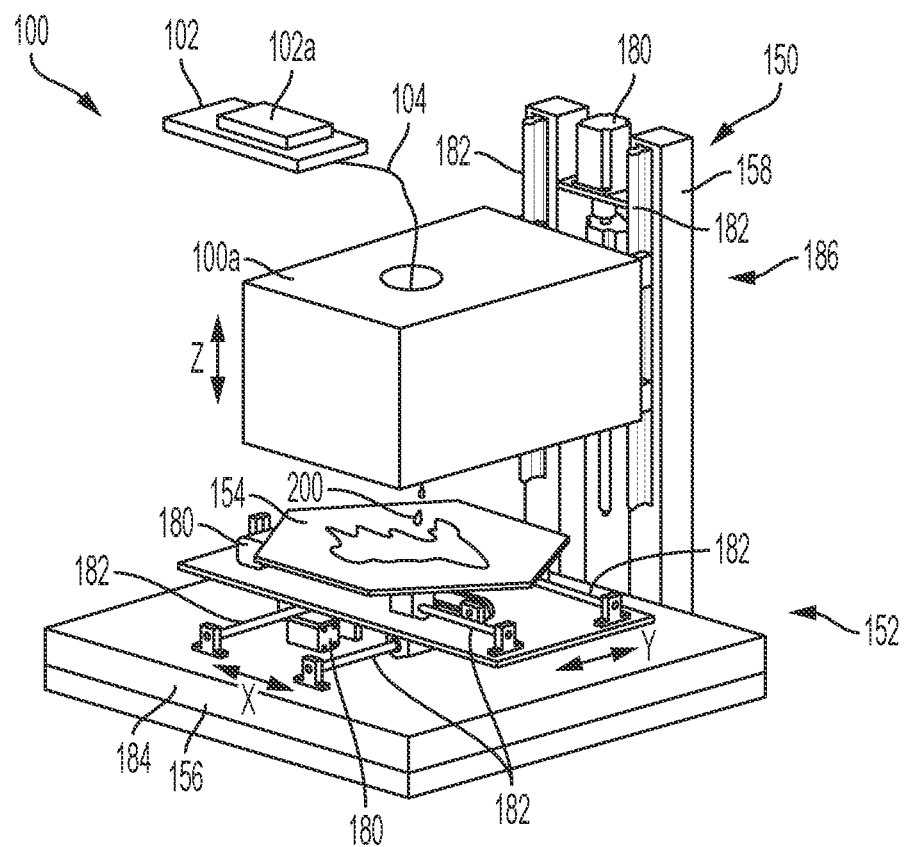
FIG. 11 is a schematic view of a 3D printer, according to an embodiment of the present disclosure.

The print substrate handling mechanism 156 can be any mechanism suitable for positioning the print substrate 154 to receive print material jettable from the plurality of ejector conduits arranged in array 107 during operation of the 3D printer 150. In an embodiment, the print substrate handling mechanism 156 has the ability to position the print substrate 154, such as a build plate or other substrate, by moving the print substrate 154 in a direction along an x-axis, a y-axis and/or a z-axis to a desired position to which the jetted print material is targeted. The array positioning mechanism 158 can be any mechanism suitable for moving the array 107 in a direction along one or more of an x-axis, a y axis and/or a z-axis to a desired position to which the jetted print material 104 is targeted. The positioning system 152, including either or both of the print substrate handling mechanism 156 and the array positioning mechanism 158, can comprise one or more actuators 180 (FIG. 11) that can function as a mover for positioning the print substrate 154 and array 107 relative to each other using, for example, a system comprising tracks 182. Examples of suitable actuators include electric motors, piezo electric motors, hydraulic actuators, and pneumatic actuators. FIG. 11 illustrates an example of such a positioning system 152, which comprises an actuated (e.g., motorized) X-Y stage 184 for supporting the print substrate 154 and a vertical track system 186 on which all or a portion 100a of printer jetting mechanism 100 can be moved using one or more actuators 180 to allow for vertical positioning. Portion 100a of printer jetting mechanism 100 can comprise any of the components of printer jetting mechanism 100 described herein that are attached to the vertical track system 186 for vertical positioning, including the plurality of ejector conduits arranged in an array and the plurality of radiant energy sources 110. The feeder mechanism 102 can be positioned so as not to be directly attached to the vertical track system 186 (as illustrated in FIG. 11), or in other embodiments, can be directly attached to the vertical track system 186.

As mentioned, the positioning system 152 can comprise one or both of the print substrate handling mechanism 156 and the array positioning mechanism 158. As an example, the print substrate handling mechanism 156 can be used to move the print substrate 154 along both the x-axis and y axis, and the array positioning mechanism 158 can be used to move the array 107 and optionally the entire printer jetting mechanism 100 or any portion thereof along the z-axis, thereby allowing the print substrate 154 and array 107 to be positioned relative to each other in three-dimensions during operation of the 3D printer. As an example, for purposes of this discussion, the x-axis and z-axis are as illustrated relative to a printing operation in FIG. 10, with the y-axis (not shown) being in the direction into the paper; the x-axis and y-axis being parallel to the upper surface of the print substrate 154 and the z-axis being perpendicular to the upper surface of the print substrate 154. In an embodiment, the print substrate 154 is a build plate and optionally employs a heating mechanism 155 that is capable of heating the build plate to desired deposition temperatures. Suitable build plates, including build plates with heating mechanisms, are well known in the art.

Methods of Jetting Print Material

An embodiment of the present disclosure is directed to a method for jetting print material from a printer jetting mechanism. As described at 200 of FIG. 9, the method comprises supplying a print material 104 to a plurality of ejector conduits 106 arranged in an array. The ejector conduits 106 comprise first ends 106A configured to accept the print material and second ends 106B comprising ejector nozzles 108. The ejector nozzles 108 can have an inner width (e.g., diameter) ranging, for example, from about 10 microns to about 1000 microns, or any of the other ejector nozzle inner widths disclosed herein. In the methods described herein, ejector nozzles 108 are illuminated with radiant energy 112 to provide thermally induced expansion and ejection of the print material as will be discussed in greater detail below.

Figure 9:
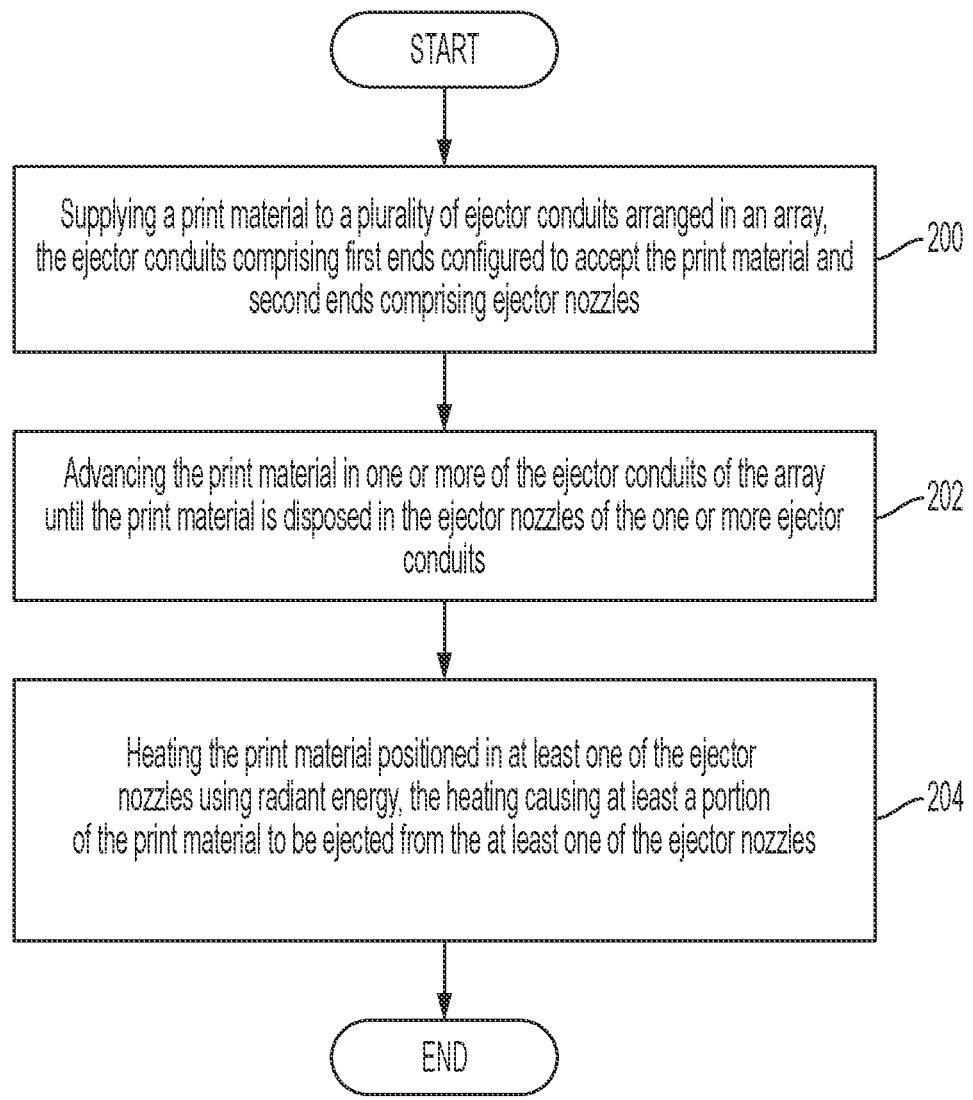
FIG. 9 is a flow diagram of a method for jetting print material from a printer jetting mechanism, according to an embodiment of the present disclosure.

As shown at 202 of FIG. 9, the print material 104 is advanced in one or more of the ejector conduits 106 of the array until the print material 104 is disposed in the ejector nozzles 108 of the one or more ejector conduits 106. In an embodiment, the print material 104 comprises a plurality of filaments. An individual filament of the plurality of filaments can be advanced to each of the one or more ejector conduits 106 to supply print material at a desired feed rate. The desired feed rate can be different for each filament depending on the rate at which the print material is being ejected from the associated ejector nozzles 108, which in turn will depend on the number of ejections per unit time from each nozzle and the droplet size per ejection.

The droplet size per ejection can be selected based on various factors, including the desired size of details in the object to be printed, the particular properties of the print material (e.g., thermal transfer and expansion properties), power of the radiant energy source, nozzle size and so forth. Droplets may generally have a diameter size that is as small as the inner diameter of the ejection nozzle 108 but could potentially have significantly larger diameters if longer lengths of filament are heated during a single ejection. When determining the amount of print material to be heated for each ejection, the trade-offs between power and droplet size can be considered. In particular, a longer length of filament can be heated with proportionally higher power, enabling a larger length of print material to be ejected. In an embodiment, the length of print material heated per pulse is about 1 times to about 10 times the inner width of the print nozzle 108 (which may be about the same as the filament width, $d_p$, (e.g., filament diameter) in the case where solid filaments are being fed directly into the print nozzle) each time the print material is jetted. Thus, as an example, the filament can be stepped forward from about one filament width per laser pulse to about 10 filament widths per laser pulse, the laser pulse melting each length of the filament as it is stepped forward.

While the cross-sectional shape of the print material 104 is illustrated in FIG. 3 as being a circle having a diameter, $d_p$, it is noted that filaments having any other cross-sectional shape, such as, for example, a polygon, rectangle, oval or other shape, can be employed as the print material 104. The cross-sectional shape of the solid filaments can be the same as that of the cross-sectional shapes of the ejector nozzles 108 (e.g., with smaller dimensions to allow feeding of filaments through the nozzle). Alternatively, the solid filaments can have a different cross-sectional shape than the cross-sectional shapes of the ejector nozzles 108. For purposes of the present disclosure, the filament width, $d_p$, for cross-sectional shapes other than a circle is the widest cross-sectional dimension (e.g. the diagonal between two opposite vertices of a square cross-section), where the cross-section is in a plane that is perpendicular in all directions to the longitudinal axis of the filament. Although "filament width" is sometimes referred to as "diameter" herein, the term "diameter" can be replaced by "width" when discussing the filament's diameter throughout this disclosure.

As shown at 204 of FIG. 9, the print material 104 positioned in at least one of the ejector nozzles 108 is heated by radiant energy 112, thereby causing the print material 104 to expand so as to provide sufficient momentum to eject at least a portion of the print material from the at least one of the ejector nozzles. This process can include the print material 104 undergoing a phase transition from a first phase to a second phase to achieve the desired expansion. In one example of a phase change expansion, filaments are supplied as print material 104 in solid phase to the ejector nozzles 108. The heating of the print material 104 positioned in the ejector nozzles 108 melts the individual filaments using a single pulse of radiation 112 from radiant energy sources 110 to provide the desired momentum of the print material for ejection. In another example of a phase change expansion, print material 104 is supplied as a liquid phase to the ejector nozzles 108. The heating of the print material 104 positioned in the ejector nozzles 108 vaporizes at least a portion of the liquid print material 104 using a single pulse of radiation 112 from radiant energy sources 110 to provide the desired momentum of the print material for ejection. In yet another embodiment, the print material 104 is supplied to the ejector nozzle as a liquid and expanded without changing phase to eject the liquid from the ejector nozzle 108. The print material 104 is expanded sufficiently rapidly using a single pulse of radiation to provide the desired momentum of the print material for ejection.

The pulse length of the radiant energy 112 can be any duration that will provide the desired expansion and cause print material 104 to be ejected. Examples of suitable pulse lengths range from about 0.1 microsecond to about 100 milliseconds, or about 1 microsecond to about 1000 microseconds, or about 1 microsecond to about 100 microseconds. This rapid heating to phase transition causes the print material to expand axially inside the ejector nozzle 108 so as to provide sufficient momentum to the print material 104 to eject at least a portion of the print material from the ejector nozzle 108. In addition to allowing for sufficient momentum for ejection, the rapid heating can also potentially allow for a rapid ejection rate (e.g., multiple ejections of print material per second from the same ejector nozzle). While achieving the expansion of print material 104 using a single pulse of radiation is taught above, it may also be useful to use more than one radiation pulse to achieve expansion, either from the same or multiple radiant energy sources, as long as the expansion of the print material occurs quickly enough to achieve the desired momentum of the print material for ejection from the ejector nozzle to occur. For example, 2, 3 or more rapid pulses can be employed to achieve the desired expansion of the print material as opposed to a single longer pulse.

After ejection of the print material 104, additional print material can be advanced into the ejector nozzle or nozzles 108 and then the heating to phase change process is repeated to eject additional print material. This process of advancing the print material and heating the print material can be repeated any number of times as desired for each of the ejector nozzles 108 in the array until the printing is complete. During the printing, the heating and ejection of print material 104 can occur from a single ejector nozzle 108 in the array at a time, simultaneously from two or more ejector nozzles 108, and/or simultaneously from all of the ejector nozzles 108 in the array, as desired to accomplish the particular printing process being carried out.

Any print material that expands sufficiently during phase change to cause sufficient momentum for ejection can be employed. In an example, the print material comprises at least one substance chosen from a metal, such as tin, tin alloys, lead, lead alloys (e.g., solder comprising one or both of tin and lead), aluminum, aluminum alloys (e.g., 1000 series, 2000 series, 3000 series, 4000 series, 5000 series, 6000 series, such as 6061 and 6063, and 7000 series aluminum alloys), iron, iron alloys (e.g., steel), copper, copper alloys (e.g., zinc), nickel, nickel alloys, titanium, titanium alloys, tungsten, tungsten alloys, silver and silver alloys; a polymer and a metal oxide (e.g., doped or undoped silica, such as glass). Suitable alloys of the above named elemental metal print materials (e.g., nickel, titanium, tungsten, silver and so forth) are well known in the art. In an embodiment, the print material 104 has a metal content of greater than 90% by weight, such as about 95% to 100%, or 98% to 100%, or 99% to 100%, or 99.5% to 100%, or 9.8% to 100% by weight, or 99.9% to 100% by weight. In an embodiment, the print material 104 has a resistivity of less than $1 \times 10^{-6}$ ohm*m at 20° C., such as about $1 \times 10^{-7}$ ohm*m to aboutx $1 \times 10^{-8}$ ohm*m at 20° C. (e.g., is electrically conductive at room temperature (20° C.)).

Any of the print materials described herein can be in the form of a plurality of solid or liquid filaments. In the case of solid filaments, the width, $d_p$, of the individual filaments are optionally chosen to be slightly smaller, or substantially the same as, the inner width, $d_i$, of the ejector nozzle 108, in which the individual filament is positioned so as to provide a close fit around the individual filament while still allowing the filament to be positioned within the ejector nozzle 108. The fit is sufficiently close so that when the portion of the filament inside the ejector nozzle undergoes expansion, the print material expands in an axial direction at a rate that is sufficient to eject at least a portion of the filament material out of the ejector nozzle 108. As an example, the filament width (e.g., diameter), $d_p$, is 0 to about 4% smaller than the ejector nozzle width (e.g., diameter), $d_i$, such as about 0.1% to about 3% smaller, or about 0.5% smaller to about 1.5% smaller. The relative sizing of $d_p$ and $d_i$ may depend on various factors, such as the expansion properties of the print material during phase change, the desired momentum of the print material upon ejection, the rate of heating of the print material in the ejector nozzle and other things. As additional examples, the filament width (e.g., diameter), which can be either for a liquid filament or a solid filament, is about 0.01 micron to 20 microns smaller than the nozzle inner width (e.g., diameter), such as about 0.1 micron to about 10 microns, or about 1 micron to about 5 microns, or about 0.1 micron to about 2 microns, or about 0.1 micron to about 1 micron smaller than the nozzle inner width (e.g., diameter).

Print material can have widths (e.g., diameters) ranging from about 10 microns to about 1000 microns, from about 20 microns to about 500 microns, from about 50 microns to about 200 microns, or about 100 microns. Print material (e.g., solid or liquid filaments) with relatively small widths (e.g., diameters) can have the advantage of faster heating through the entire thickness because thermal diffusivity determines the heat propagation time from the periphery of the filament to the center. The ability to heat and expand the entire thickness of a filament in short bursts can allow for increased control of ejection momentum and/or ejection amounts (e.g., droplet sizes), among other things. Small diameters may also allow for smaller discrete jettable amounts of print material (e.g., smaller droplet sizes ejected from ejection nozzles 108). Therefore filaments with relatively small diameters may be preferable for these reasons. Desired small diameter sizes will depend on the thermal diffusivity properties of the print material as well as other factors. In an embodiment, the print material width (e.g., solid or liquid filament diameter) ranges from about 10 microns to about 100 microns, such as about 10 microns to about 50 microns, or about 10 microns to about 25 microns. The inner widths (e.g., diameters) of the ejector nozzles can be sized as described above so as to provide a close fit around the individual filaments while still allowing the filaments to be positioned within the ejector nozzles.

During heating using the radiant energy, any radiation from the radiant energy sources 110 that would otherwise not strike the print material 104 can be directed towards the print material 104 by refraction in transparent material 114 of the ejector conduits 106 and/or reflection from the reflective surfaces 124 of ejector housing 120, as described above. In an embodiment, a laser beam that is wider than the filament diameter can be employed. The excess portion of the laser beam that does not directly strike the print material 104 can be refracted and/or reflected onto the print material so as to more uniformly heat the entire surface of the print material.

In embodiments where the radiant energy 112 is to be absorbed directly by the print material 104 (as opposed to being absorbed, for example, by a layer of thermal absorption material 116), the print material 104 can be provided (either by an in-line process or as-manufactured) with a modified surface that increases absorption at the radiant energy wavelength (e.g., the laser wavelength) compared to the same print material without the modified surface. This could include modifying the color of the filament surface to reduce reflection, applying an antireflective coating to a solid filament and/or treating the filament surface in some other manner. As an example, anodic etching of the surface of a solid print material 104 is one treatment method that can be used to increase radiation absorptivity. Anodic etching may be particularly useful for increasing absorptivity of highly reflective solid metal filaments. Note that it is possible that an anodized surface may lose its absorptive ability before the radiant energy is fully absorbed. Employing such filaments as the print material in the methods of the present disclosure may help to increase the speed of expansion of the print material, which in turn, may increase the deposition rate of the print material being jetted. In an example, the modified surface can absorb about 90% to 100% of the incident illumination at the wavelength of the radiant energy.

In embodiments, the print material 104 is supplied to the ejector conduits as either a liquid or a solid and is ejected from the ejector nozzles 108 as a liquid in the form of droplets. The droplets can optionally have a relatively small droplet size, which can allow for printing of fine details. As examples, droplet diameters can range from about 0.001 mm to about 0.2 mm, about 0.005 mm to about 0.1 mm, and about 0.01 mm to about 0.05 mm. Droplets with larger diameters can also potentially be formed if desired.

Figure 5B:
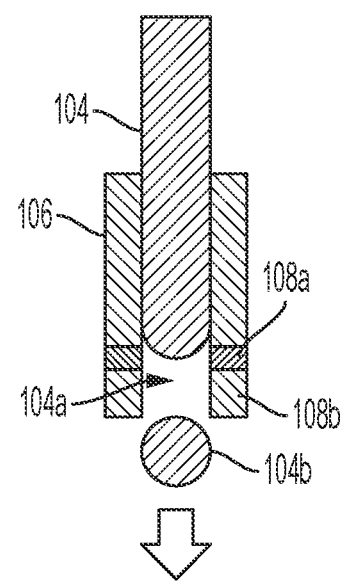
FIG. 5B illustrates a schematic, cross-sectional view of the ejector conduit of FIG. 5A, after vaporization of a portion of the print material and ejection of another portion of the print material below the vaporized portion, according to an embodiment of the present disclosure.

In another embodiment, the print material 104 is supplied to the ejector nozzles 108 as a first phase that is a liquid and then a portion of the print material is heated to a second phase that is a vapor. Referring to FIGS. 5A and 5B, in such a process, at least a portion of the passageways 106C prior to the ejector nozzles 108 are filled with molten print material (e.g., any of the print materials described herein). All or a portion of passageways 106C can optionally be tapered, as described herein. Using radiant energy 112 from radiant energy sources 110, which is transmitted through the at least one window 108a, a first portion 104a of the molten print material 104 proximate window 108a is vaporized by rapid heating in the ejector nozzles 108 while a second portion 104b that is between the first portion 104a and a tip of the ejector nozzle 108 remains a liquid. The vaporized portion 104a of print material 104 expands axially to provide motive force that is sufficient to eject the liquid second portion 104b of the print material from the ejector nozzles 108. In an embodiment, the print material 104 can initially be supplied as a solid to the first ends 106A of ejector conduits 106 using the feeder mechanism 102, melted prior to introduction into the ejector nozzles 108, such as by using heat from a heater mechanism 126, then vaporized by rapid heating in the ejector nozzles 108 to provide the desired motive force for jetting. Alternatively, the print material 104 can be supplied as a liquid to the first ends 106A of ejector conduits 106 using the feeder mechanism 102, maintained as a liquid using heat from heater mechanism 126, then vaporized by rapid heating caused by radiant energy 112 striking the ejector nozzles 108 to provide the desired motive force for jetting.

In embodiments where the print material 104 is a solid and then is phase changed to a liquid, controlling the print material temperatures so as to be lower than the melting temperature directly after each ejection can be desirable to ensure resolidification of non-ejected material before the next ejection event.

The method of the present disclosure can be employed to deposit print material 104 from any number of ejector conduits 106 simultaneously or separately as desired. It can also allow for the deposition of small amounts of material from any one ejector nozzle 108 while still providing for a relatively high overall deposition rate due to the potentially large number of ejector conduits 106 in the array and the potential rate of ejection from each ejector conduit 106.

Figure 10:
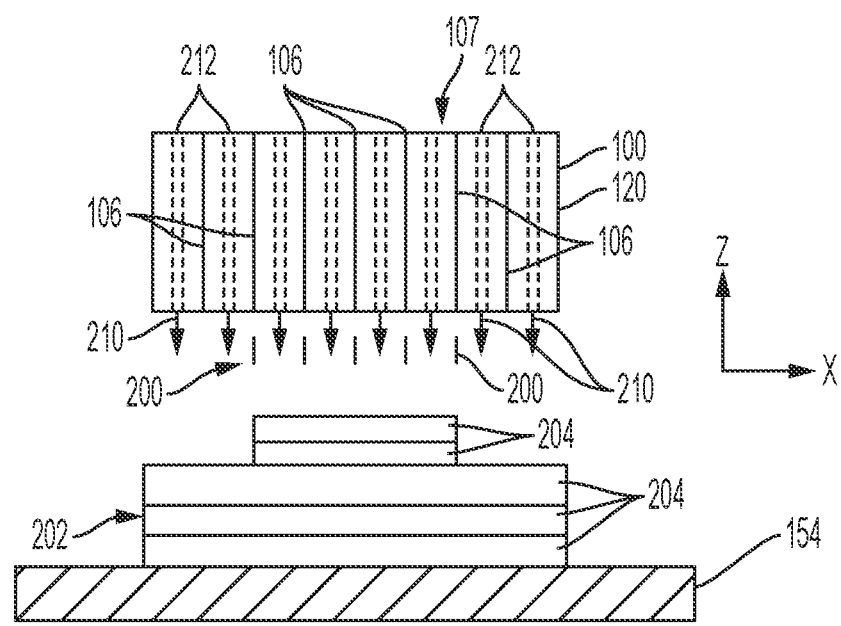
FIG. 10 illustrates a schematic side view of a printer jetting mechanism comprising a plurality of ejector conduits simultaneously ejecting droplets to print a 3D object on a print substrate, according to an embodiment of the present disclosure.

The printer jetting mechanisms for jetting print material described herein can be employed in various printing methods. For example, any of the printer jetting mechanisms described herein can be employed in a method of three-dimensional printing in which print material 104 is ejected from the ejector nozzles 108 and deposited onto a print substrate 154, such as a build plate. One or both of the print substrate 154 and the array 107 of ejector nozzles 108 can move relative to each other in three dimensions during printing (e.g., in directions along an x-axis, y-axis and z-axis), in any manner as described herein, thereby forming a 3D object. As is well known in the art, 3D printing comprises printing multiple droplets or layers of material, where each droplet or layer can be stacked one on the other, until a desired thickness of the 3D object is realized. FIG. 10 illustrates an example of a printer jetting mechanism 100 comprising a plurality of ejector conduits 106 simultaneously ejecting droplets 200 to print a 3D object 202 on a print substrate 154. Many layers 204 of droplets 200 may be deposited, one layer or droplet on the next, until the 3D object is completed. As would be readily understood by one of ordinary skill in the art, the droplets and/or layers can be stacked in any desired order, so that, for example, a first underlying layer 204 may or may not be completed before beginning subsequent layers and there may or may not be a recognizable layering pattern to the order of material deposition. Rather, the droplets, layers and/or portions of layers can be stacked in any desired order to complete the 3D object The following examples are illustrative only and are not meant to, nor do they, limit the scope of the invention as set forth in the claims.

PROPHETIC EXAMPLES

Example 1: Solid to Liquid Phase Change Expansion: One each of aluminum, copper and iron wires having diameters of 0.0001 meters are held just below the melting temperature and each fed into a separate refractory tube (e.g. fused silica tube) with an inner diameter just larger than the outer diameter of the wires. A laser pulse is absorbed by a 0.0001 meter end portion of each wire and melts the wire portion in microseconds. During melting, the expansion of the molten wire material occurs primarily along the direction of the silica tubes longitudinal axis. The free meniscus of the molten material accelerates axially in the tube and the molten region accelerates at approximately half the rate of the meniscus. The acceleration of the molten material in the tube, as shown in Table 1 below, corresponds to an energy well above the energy it takes to detach a droplet of the molten material from the wire and eject it from the tube, thus resulting in a droplet of molten material being jetted from the tube. The energy employed to melt a sufficient portion of the wire for jetting is supplied by a laser that is capable of pulsing at the desired pulse power, such as a fiber laser or scanned, modulated laser.

The calculations in Table 1 below assume no volume between the wire and the tube. The calculated motive force=Average Acceleration of the melt times the mass of the melt. The "pulse energy" in the table refers to the energy to melt the wire length and could potentially be supplied by a single laser pulse.

TABLE 1

| Wire Properties | Units | | Al wire | Cu wire | Fe wire | |
|---|---|---|---|---|---|---|
| $T_{melt}$ | C. | | 660 | 1084 | 1150 | |
| Density | kg/m$^3$ | | 2700 | 8960 | 7870 | $\rho_m$ |
| Latent heat | kJ/kg | | 396 | 206 | 247 | $\Lambda$ |
| Specific latent heat | kJ/m$^3$ | | 1.07E+06 | 1.85E+06 | 1.94E+06 | $\lambda$ |
| Thermal expansion on melt | | | 6.50E−02 | 5.30E−02 | 3.50E−02 | $\varepsilon$ |
| Mass | kg | | 2.12E−09 | 7.04E−09 | 6.18E−09 | m = $\rho \pi d^2 l/4$ |
| Diameter | m | 0.0001 | | | | d |
| Length | m | 0.0001 | | | | l |
| | | Melting of wire in Silica Tube | | | | |
| Elongation of wire material in silica tube due to melt | m | | 6.50E−06 | 5.30E−06 | 3.50E−06 | $\Delta l = \varepsilon l$ |
| Pulse length of laser | s | 5.00E−06 | | | | $t_p$ |
| Meniscus velocity of | m/s | | 1.30 | 1.06 | 0.70 | |

TABLE 1-continued

| Wire Properties | Units | Al wire | Cu wire | Fe wire | |
|---|---|---|---|---|---|
| melt in Tube Meniscus Acceleration in Tube | m/s² | 2.60E+05 | 2.12E+05 | 1.40E+05 | $a = \Delta l/t_p^2$ |
| Average acceleration in Tube | m/s² | 1.30E+05 | 1.06E+05 | 7.00E+04 | $a_m = 0.5a$ |
| Motive force | N | 8.78E−05 | 2.37E−04 | 1.38E−04 | $F = ma_m$ |
| Pulse energy for melt | J | 8.40E−04 | 1.45E−03 | 1.53E−03 | $E = m\Lambda$ |
| Pulse power | W | 1.68E+02 | 2.90E+02 | 3.05E+02 | $P = E/t_p$ |

Example 2: Liquid to Liquid Expansion: One each of aluminum, copper, iron and indium wires having diameters of 0.0001 meters are fed into a separate refractory tube (e.g. fused silica) with an inner diameter just larger than the outer diameter of the wires. Liquid metals such as mercury (Hg), gallium-indium or gallium-indium-tin eutectic mixtures are fed into a similar silica tube. For the wires materials, at least a portion of each wire is melted and maintained as a liquid proximate the end of the silica tube, so that the meniscus of the liquid is positioned at the end of the graphite tube. Then a laser pulse is absorbed by a 0.0001 meter end portion of each silica tube to heat the liquid material therein so as to increase the temperature by about 300 Kelvin in about 5 microseconds. During heating, the expansion of the liquid materials occurs primarily along the direction of the silica tubes longitudinal axis. The free meniscus of the molten material accelerates axially in the tube and the molten region accelerates at approximately half the rate of the meniscus. The acceleration of the molten material in the tube, as shown in Table 2 below, corresponds to an energy above the energy it takes to detach a droplet of the molten material from the liquid and eject it from the tube, thus resulting in a droplet of molten material being jetted from the tube. The energy employed to heat a sufficient portion of the material for jetting is supplied by a laser that is capable of pulsing at the desired pulse power.

For the calculations in Table 2 below, motive force=Average Acceleration of the liquid times the mass of the liquid. The "pulse energy" in Table 2 refers to the energy to raise the temperature of the liquid by 300 Kelvin and could potentially be supplied by a single laser pulse.

TABLE 2

| Wire/Material Properties | Units | Al Wire | Cu Wire | Fe Wire | Hg | In | |
|---|---|---|---|---|---|---|---|
| $T_{melt}$ | C. | 660 | 1084 | 1150 | | 157 | |
| Density | kg/m3 | 2700 | 8960 | 7870 | 13600 | 7100 | ρμ |
| Specific heat of melt | kJ/kg-K J/kg-K | 1.18 1180 | 0.49 490 | 0.82 820 | 140 | 230 | c. |
| Thermal expansivity of melt | 1/K | 1.34E−04 | 1.12E−04 | 9.20E−05 | 1.80E−04 | 1.00E−04 | β |
| Diameter | m | 0.0001 | | | | | d |
| Length | m | 0.0001 | | | | | l |
| Mass | kg | 2.12E−09 | 7.04E−09 | 6.18E−09 | 1.07E−08 | 5.58E−09 | m = rpd2l/4 |
| Molten material heating and expansion in silica tube | | | | | | | |
| Temperature rise | K | 300 | | | | | ΔT |
| Elongation | | 4.02E−02 | 3.36E−02 | 2.76E−02 | 5.40E−02 | 3.00E−02 | ε = βΔT |
| Elongation | m | 4.02E−06 | 3.36E−06 | 2.76E−06 | 5.40E−06 | 3.00E−06 | Dl = el |
| Pulse length | s | 5.00E−06 | | | | | tp |
| Velocity meniscus | m/s | 0.80 | 0.67 | 0.55 | 1.08 | 0.60 | v = Dl/tp |
| Acceleration meniscus | m/s2 | 1.61E+05 | 1.34E+05 | 1.10E+05 | 2.16E+05 | 1.20E+05 | a = Dl/tp2 |
| Average acceleration | m/s2 | 8.04E+04 | 6.72E+04 | 5.52E+04 | 1.08E+05 | 6.00E+04 | am = 0.5a |
| Motive force | N | 1.70E−04 | 4.73E−04 | 3.41E−04 | 1.15E−03 | 3.35E−04 | F = mam |
| Pulse energy | J | 7.51E−04 | 1.03E−03 | 1.52E−03 | 4.49E−04 | 3.85E−04 | E = mcDT |
| Pulse power | W | 1.50E+02 | 2.07E+02 | 3.04E+02 | 8.97E+01 | 7.70E+01 | P = E/tp |

Example 3: Liquid to Vapor Phase Change Expansion: One each of aluminum, copper and iron wires having diameters of 0.0001 meters are fed into a separate refractory tube (e.g. a graphite tube) with an inner diameter just larger than the outer diameter of the wires. At least a portion of each wire is melted and maintained as a liquid proximate the end of the graphite tube, so that the meniscus of the liquid is positioned at the end of the graphite tube. The graphite tube includes a window positioned just above a 100 micron graphite end portion of the tube. The window comprises a material that is transparent to light emitted from a laser used for vaporizing the liquid. The window has a dimension along the length of the tube of about 25 microns. A laser pulse from the laser is transmitted through the window and causes the liquid material proximate the window to vaporize in about 5 microseconds. An end portion of the molten material between the window and the tip of the graphite remains a liquid. During heating, the expansion of the vaporized material occurs primarily along the longitudinal axis of the graphite tube and forces the end portion of the liquid, or molten material, to accelerate axially so as to be ejected from the tube, thus resulting in a droplet of molten material being jetted from the tube. The energy employed to heat and vaporize a sufficient portion of the molten material for jetting is supplied by a laser that is capable of pulsing at the desired pulse power.

For Table 3 below, the "pulse energy" refers to the energy used to vaporize a portion of the liquid as described above and could potentially be supplied by a single laser pulse.

TABLE 3

| Wire/Material Properties | Units | Al wire | Cu wire | Fe wire | Symbol or Formula |
|---|---|---|---|---|---|
| $T_{boil}$ | C. | 2327 | 2595 | 2862 | |
| Density | kg/m3 | 2700 | 8960 | 7870 | ρμ |
| Latent heat | kJ/kg | 11400 | 5069 | 6340 | Λ |
| Specific latent heat | kJ/m3 | 3.08E+07 | 4.54E+07 | 4.99E+07 | λ |
| Mass | kg | 5.30E−10 | 1.76E−09 | 1.55E−09 | m = rpd2l/4 |
| Diameter | m | 0.0001 | | | d |
| Length | l | 2.5E−05 | | | l |
| Vaporization of portion of liquid in graphite tube | | | | | |
| Pulse length | s | 5.00E−06 | | | tp |
| Pulse energy | J | 6.04E−03 | 8.92E−03 | 9.80E−03 | E = mL |
| Pulse power | W | 1.21E+03 | 1.78E+03 | 1.96E+03 | P = E/tp |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of printing a three-dimensional object, the method comprising:

supplying a print material to a plurality of ejector conduits arranged in an array, the ejector conduits comprising first ends configured to accept the print material and second ends comprising ejector nozzles, and the ejector conduits further comprising a transparent material and an absorbing material, a refractory material, or both;

advancing the print material in one or more of the ejector conduits of the array until the print material is disposed in the ejector nozzle of the one or more ejector conduits;

heating the print material positioned in at least one of the ejector nozzles using radiant energy, the radiant energy passing through the transparent material striking and heating the print material therein, the heating causing at least a portion of the print material to be ejected from the at least one of the ejector nozzles and onto a print substrate, and the transparent material refracting excess portions of the radiant energy that miss the print material therein and instead strike sides of the ejector conduits, so that the excess portions are redirected toward the print material within the ejector nozzles; and repeating both the advancing the print material and the heating the print material to form a three-dimensional object on the print substrate.

2. The method of claim 1, wherein the ejector nozzles have an inner width ranging from about 10 microns to about 1000 microns.

3. The method of claim 1, wherein the print material comprises a plurality of filaments, and further wherein the advancing the filaments comprises advancing an individual filament of the plurality of filaments to each of the one or more ejector conduits.

4. The method of claim 3, wherein the radiant energy is a laser pulse having a pulse length ranging from about 1 microsecond to about 100 microseconds.

5. The method of claim 3, wherein the plurality of filaments comprise at least one substance chosen from a metal, a polymer and a metal oxide.

6. The method of claim 3, wherein the plurality of filaments comprise a metal having a resistivity of less than $1 \times 10^{-6}$ ohm·m at 20° C.

7. The method of claim 3, wherein the plurality of filaments comprise a solid metal having an anodized surface.

8. The method of claim 3, wherein the individual filament has a width that is about 0 to about 4% smaller than an inner width of the ejector nozzle in which the individual filament is positioned.

9. The method of claim 1, wherein during the heating of the print material positioned in at least one of the ejector nozzles using radiant energy, at least a portion of the print material undergoes a phase transition from a first phase to a second phase.

10. The method of claim 9, wherein first phase is a solid and the second phase is a liquid.

11. The method of claim 10, wherein the liquid is ejected from the ejector nozzle of the one or more ejector conduits as droplets having a droplet diameter ranging from about 0.001 mm to about 0.2 mm.

12. The method of claim 9, wherein the first phase is a liquid and the second phase is a gas, and further wherein a first portion of the print material positioned in the at least one of the ejector nozzles undergoes the phase transition while a second portion of the print material between the first portion and a tip of the ejector nozzle remains a liquid, the second portion being the portion of the print material that is ejected from the at least one of the ejector nozzles.

13. The method of claim 1, wherein during the heating of the print material positioned in at least one of the ejector nozzles using radiant energy, the print material is maintained in a single phase.

14. The method of claim 1, wherein the heating comprises simultaneously heating the print material positioned in the ejector nozzles of 2 or more ejector conduits.

15. The method of claim 1, wherein the printed object is a three-dimensional object comprising a plurality of stacked layers of print material.

16. The method of claim 1, wherein the ejector conduits further comprise the absorbing material, and wherein the absorbing material comprises diamond-like carbon, graphite, black chrome, black alumina, or a combination thereof.

17. The method of claim 1, wherein the ejector conduits further comprise the refractory material, which is configured to absorb the radiant energy and convert the radiant energy to thermal energy sufficient to cause an expansion of the print material in the ejector nozzles, and wherein the refractory material comprises graphite, platinum, tungsten, ceramic, or a combination thereof.

18. A method for jetting print material from a printer jetting mechanism, the method comprising:
supplying a print material to a plurality of ejector conduits arranged in an array, the ejector conduits comprising first ends configured to accept the print material and second ends comprising ejector nozzles, and the ejector conduits further comprising a transparent material and an absorbing material, a refractory material, or both;
advancing the print material in one or more of the ejector conduits of the array until the print material is disposed in the ejector nozzles of the one or more ejector conduits; and
heating the print material positioned in at least one of the ejector nozzles using radiant energy, the radiant energy passing through the transparent material striking and heating the print material therein, the heating causing at least a portion of the print material to be ejected from the at least one of the ejector nozzles, and the transparent material refracting excess portions of the radiant energy that miss the print material therein and instead strike sides of the ejector conduits, so that the excess portions are redirected toward the print material within the ejector nozzles.

19. The method of claim 18, wherein the ejector nozzles having an inner width ranging from about 10 microns to about 1000 microns.

20. The method of claim 18, wherein the print material comprises a plurality of filaments, and further wherein the advancing the filaments comprises advancing an individual filament of the plurality of filaments to each of the one or more ejector conduits.

21. The method of claim 20, wherein the radiant energy is a laser pulse having a pulse length ranging from about 1 microsecond and about 100 microseconds.

22. The method of claim 20, wherein the plurality of filaments comprise at least one substance chosen from a metal, a polymer and a metal oxide.

23. The method of claim 20, wherein the plurality of filaments comprise a metal.

24. The method of claim 23, wherein the plurality of filaments comprise a solid metal having an anodized surface.

25. The method of claim 20, wherein the individual filament has a width that is about 0 to about 4% smaller than an inner width of the ejector nozzle in which the individual filament is positioned.

26. The method of claim 18, wherein during the heating of the print material positioned in at least one of the ejector nozzles using radiant energy, the print material undergoes a phase transition from a first phase to a second phase.

27. The method of claim 26, wherein the first phase is a solid and the second phase is a liquid.

28. The method of claim 27, wherein the liquid is ejected from the ejector nozzle of the one or more ejector conduits as droplets having a droplet diameter ranging from about 0.001 mm to about 0.2 mm.

29. The method of claim 26, wherein the first phase is a liquid and the second phase is a gas, and further wherein a first portion of the print material positioned in the at least one of the ejector nozzles undergoes the phase transition while a second portion of the print material between the first portion and a tip of the ejector nozzle remains a liquid, the second portion being the portion of the print material that is ejected from the at least one of the ejector nozzles.

30. The method of claim 18, wherein during the heating of the print material positioned in at least one of the ejector nozzles using radiant energy, the print material is maintained in a single phase.

31. The method of claim 18, wherein the heating comprises simultaneously heating the print material positioned in the ejector nozzles of 2 or more ejector conduits.

\* \* \* \* \*